United States Patent [19]

Edwards et al.

[11] 4,155,750

[45] May 22, 1979

[54] RECOVERY AND PURIFICATION OF RHODIUM

[75] Inventors: Roderick I. Edwards, Honeydew; Monika M. Fieberg, Johannesburg; Wolter A. te Riele, Johannesburg; Barry C. Want, Johannesburg, all of South Africa

[73] Assignee: National Institute for Metallurgy, Randburg, South Africa

[21] Appl. No.: 937,733

[22] Filed: Aug. 29, 1978

[30] Foreign Application Priority Data

Sep. 6, 1977 [ZA] South Africa ..................... 77/5358

[51] Int. Cl.$^2$ ............................................. C22B 11/04
[52] U.S. Cl. ....................................... 75/121; 75/108; 423/22
[58] Field of Search ..................... 75/108, 121; 423/22

[56] References Cited

U.S. PATENT DOCUMENTS

| | | | |
|---|---|---|---|
| 3,929,469 | 12/1975 | Pittie et al. | 75/108 |
| 3,979,207 | 9/1976 | MacGregor | 423/22 X |
| 3,997,337 | 12/1976 | Pittie et al. | 75/121 |
| 4,081,271 | 3/1978 | Ugo | 75/108 |

*Primary Examiner*—G. Ozaki
*Attorney, Agent, or Firm*—Cushman, Darby & Cushman

[57] ABSTRACT

A process for the recovery or purification of rhodium wherein:
(i) a solution of a soluble anionic rhodium complex is treated to precipitate insoluble pentammino-chloro rhodium dichloride;
(ii) the rhodium is redissolved in the form of the equivalent hydroxo complex cation;
(iii) the solution is treated to precipitate the nitrate salt of the pentammino-nitro rhodium complex;
(iv) the precipitate is converted to pentamminochloro rhodium dichloride; and,
(v) the latter is calcined to form rhodium metal.

13 Claims, No Drawings

RECOVERY AND PURIFICATION OF RHODIUM

This invention relates to the recovery and purification of Rhodium.

Rhodium is a member of the 'platinum-group' of transition metals and is usually found in nature in close association with other metals of the group. It is recovered together with the other platinum group metals by various methods usually to produce a 'precious metal concentrate' which contains, besides the six platinum-group metals, (viz. platinum, palladium, ruthenium, iridium, rhodium and osmium) substantial concentrations of gold, silver, and usually a number of other metals of lesser value.

Such concentrates are then treated by various processes to separate the constituents and to produce the individual metals in as pure a form as possible. Examples of such processes include those based on selective precipitation techniques and new processes employing solvent extraction, ion-exchange methods or both of the latter.

Although the processes used in the separation of the platinum metals are widely varied it is remarkable that there is usually little variation in the order in which the metals are separated. This order is usually: Ag, Au, Pt, Pd, Ru and Os, Ir and finally Rh but in some cases the order in which platinum and palladium are removed is reversed. Almost always, however, rhodium is the last element to be removed.

The reason for this is related to the chemistry of the elements and also to their relative abundance in the ores; usually the major constituents are removed first. Of all the platinum group metals, rhodium has the chemistry least suited to easy and quantitive separation from the others, while the other elements exhibit chemistry which allows their separation in efficient fashion.

Examples of the chemistry which makes for easy separation of the other platinum group metals are as follows:

Au - the ease with which it may be reduced to metal to precipitate from solution Pt - the stability properties of the Pt(IV) oxidation state which allow separation by precipitation or solvent extraction techniques.

Pd - the fast kinetics of the Pd (II) oxidation state allow selective precipitation through ligand exchange reactions to be achieved. Solvent extraction techniques can also be used.

Os - the ease with which the Os (VIII) oxidation state can be obtained and the volatility of the tetroxide which enables it to be distilled off from solution.

Ru - the Ru (VIII) oxidation state can be treated as for Os. Alternatively the unique stability of nitrosylruthenium complexes can be employed.

Ir - oxidation to the Ir(IV) oxidation state allows separation by means similar to that used for platinum.

Because of these factors the other metals are usually separated away from rhodium. In consequence rhodium is gradually concentrated in solution together with the base metals present in the concentrate, and any other platinum group metal which is not quantitatively removed by the prior separation processes.

Because of this, rhodium is thus finally present in solution together with major amounts of base metals, and, almost inevitably in practice, minor amounts of all of the other platinum group metals.

The separation and purification of rhodium contained in such solutions has always presented one of the most intractable problems in the platinum group metals refining industry.

Various techniques have been used which rely on a number of different effects. Such techniques include:

1. The 'bisulphate fusion' by which means rhodium is, to a certain extent, selectively dissolved.
2. Selective reduction with formic acid which is only effective when the rhodium solution has undergone extensive prior purification, especially with respect to platinum group metal and heavy base metal content.
3. Various salt precipitations including the sodium ammonium hexanitritorhodium precipitation which generally exhibits rather poor selectivity.

Because of the lack of really effective separation techniques for rhodium, pure metal can only be produced after a number of stages in which recoveries are generally low. This means that extensive recycling of solutions is necessary and that the process time involved is very long.

It is the object of this invention to provide a process having both high selectivity and good recovery.

In accordance with this invention there is provided a process for the recovery or purification of rhodium comprising the steps of:

(a) treating with the aid of a catalyst capable of generating hydride ions and in the presence of ammonia, a rhodium containing solution to precipitate rhodium as the insoluble complex pentammino-chloro rhodium (III) dichloride $(Rh(NH_3)_5Cl)Cl_2$, (b) separating the resultant precipitate from the solution, (c) dissolving the precipitate so formed in caustic soda solution to form the equivalent hydroxo complex, $(Rh(NH_3)_5OH)^{2+}$, (d) adding an alkali metal nitrite to the solution formed in step (c) to form the nitro complex $(Rh(NH_3)_5NO_2)^{2+}$ and acidifying the solution with nitric acid to precipitate the nitrate salt $(Rh(NH_3)_5NO_2)(NO_3)_2$, (e) converting the pure nitro-pentammino salt to the chloro pentammino rhodium (III) dichloride by boiling with HCl, and, (f) calcining the latter to form rhodium metal.

If required the step (d) above may be followed by a recrystallization step in which the nitrate salt is recrystallized using hot water to achieve further purification thereof.

Also, step (c) may be followed by a lowering of the pH of the solution formed in step (c) to between 8,5 and 9,5 and removing any precipitated base metal hydroxides by filtration prior to commencing with step (d).

The above defined steps are preferably carried out in the following manner:

The rhodium bearing solution is treated by suitable means to produce a soluble chloride complex anion in weak hydrochloric acid solution which is preferably less than 1 Molar. To this solution is added a small quantity of commercial ethanol to catalyse the formation of the desired complex and the solution is then treated with ammonia liquor or gas until a pH value greater than 9 is achieved. Formaldehyde, formic acid or any other suitable organic compound capable of generating hydride ions may be used instead of ethanol as the catalyst. The resultant solution is allowed to boil under reflux for a few hours (generally at least 2 hours)

and is then acidified to a pH value less than 0 or until the free acid concentration is at least 0,5 Moles HCl per liter and the rhodium salt is filtered off.

Selectivity against base metal precipitation in this first stage is high but not absolute as the salt will include base metal hydroxides formed during the alkaline stage and which are slow to dissolve during acid treatment. Selectivity against other platinum group metals is not high in this stage.

The recovery of rhodium in the precipitate should be extremely good, exceeding 99% in some cases, the limiting concentration of rhodium in the barren solution being about 250 ppm Rh.

The salt is then slurried with demineralised or otherwise purified water and a concentrated caustic soda solution is added while boiling. Sufficient caustic soda is added to dissolve the precipitate. The solubility of the salt is at least 200 g/l Rh.

Some base metals are soluble at this high pH value (of the order of 13,5) and base metals may be removed almost entirely by lowering the pH value of the solution to between 8.5 and 9.5 using a neutralising agent. A convenient reagent is sodium bicarbonate. Filtration of the rhodium solution at this stage results in a virtually quantitive separation of rhodium from any base metals remaining after the first stage.

The filtered solution is then cooled and sodium nitrite is added in twice the stoichiometric amount. Concentrated nitric acid is then added to the solution until a pH value less than one and preferably less than zero is obtained. The solution must be kept cool during this operation.

This results in the formation of a heavy white precipitate of $(Rh(NH_3)_5NO_2)(NO_3)_2$. Selectivity against the other platinum group metals present in the solution is very high at this stage, but some impurities may be entrained in the crystals.

Recovery of rhodium in this stage should be even higher than in the first stage.

Final purification is achieved by recrystallisation of the nitropentammine salt. This salt has the useful property of being practically insoluble in cold water whereas it has a high solubility near the boiling point of water. This means that recrystallisation can be achieved with high recoveries and in fact the procedure may be repeated a number of times without incurring significant loss of rhodium.

This purified salt cannot be directly reduced to rhodium metal sponge as there is a danger of an explosion occurring. For this reason the salt is converted back to the chloropentammine by boiling it with concentrated HCl whereupon the nitrite and nitrate radicals are destroyed and the chloropentammine rhodium (III) dichloride is reprecipitated.

The operation of the procedure described above is illustrated by the following two examples:

EXAMPLE 1

A rhodium solution in weak HCl contained:

| Rh | 50g/l | Ru | 100 ppm |
|---|---|---|---|
| Al | 7g/l | Pt | 20 ppm |
| Ni | 2g/l | Pd | 5 ppm |
| Fe,Cu,Pb,etc. | 5-20 ppm | | |
| Ir | 500 ppm | | |

This was treated as outlined above to give the following yields of rhodium in the salt form.

| 1. | initial chloropentammine dichloride | 98.5% |
|---|---|---|
| 2. | initial nitropentammine dinitrate | 97.0% |
| 3. | recrystallised | 94.0% |
| 4. | pure chloropentammine dichloride | 91.5% | i.e. less than 10% of the rhodium was lost in effluent solutions which would require recycling.

The final pure salt was calcined to metal and analysed for impurities with the following results:

| Impurity | Concentration ppm |
|---|---|
| Ir | 100 |
| Ru | 5 |
| Pb | 5 |
| Al | 25 |
| Cu | 5 |
| Pt | 5 | i.e. the purity was better than 99.95% which is acceptable as pure metal.

EXAMPLE 2

The rhodium solution treated in this case contained a different array of impurity elements as follows:

| Rh | 60 g/l |
|---|---|
| Pt | 250 ppm |
| Pd | 120 ppm |
| Ir | 65 ppm |
| Ru | 300 ppm |
| Ag | 1200 ppm |
| Pb | 2000 ppm |
| Te | 150 ppm |
| Fe | 500 ppm |
| Cu | 750 ppm |
| Ni | 250 ppm |

This was treated in the same manner as in Example 1. Yields during all stages were similar, the overall yield being slightly lower at 89%.

The metal produced from the process was analysed and found to contain.

| Pt | 45 ppm |
|---|---|
| Pd | N.D. |
| Ir | 5 ppm |
| Ru | 25 ppm |
| Ag | 10 ppm |
| Fe | 5 ppm |
| Cu | 10 ppm |
| Ni | 10 ppm |
| Pb | 15 ppm | i.e. a purity just below 99.99% was thus achieved.

What we claim as new and desire to secure by Letters Patent is:

1. A process for the recovery or purification of rhodium comprising the steps of:
   (a) treating with the aid of a catalyst capable of generating hydride ions and in the presence of ammonia, a rhodium containing solution to precipitate rhodium as the insoluble complex pentammino-chloro rhodium (III) dichloride $(Rh(NH_3)_5Cl)Cl_2$,
   (b) separating the resultant precipitate from the solution,
   (c) dissolving the precipitate so formed in caustic soda solution to form the equivalent hydroxo complex, $(Rh(NH_3)_5OH)^{2+}$, (d) adding an alkali metal nitrite to the solution formed in step (c) to form the nitro complex $Rh(NH_3)_5NO_2)^{2+}$ and acidifying the solution with nitric acid to precipitate the nitrate salt $(Rh(NH_3)_5NO_2)(NO_3)_2$ (e) converting the pure nitro-pentammino salt to the chloro pentammino rhodium (III) dichloride by boiling with HCl, and, (f) calcining the latter to form rhodium metal.

2. A process as claimed in claim 1 in which step (d) is followed by at least one recrystallisation step in which the nitrate salt formed in step (d) is dissolved in hot water and recrystallized by cooling the resultant solution.

3. A process as claimed in claim 2 in which the recrystallization step is repeated at least one further time.

4. A process as claimed in claim 1 in which step (c) is followed by a lowering of the pH of the solution by addition of a neutralising agent to a pH of between 8,5 and 9,5 and any precipitate formed is separated from the solution prior to commencing with step (d).

5. A process as claimed in claim 4 in which sodium bicarbonate is utilized as the neutralizing agent.

6. A process as claimed in claim 1 in which the rhodium, if not already present in such form, is converted to a soluble chloride complex anion in weak hydrochloric acid solution prior to commencing step (a) of the process.

7. A process as claimed in claim 1 in which ethanol is utilized as the catalyst in step (a) of the process.

8. A process as claimed in claim 1 in which, in step (a) of the process, ammonia is added until a pH of at least 9 is achieved.

9. A process as claimed in claim 1 in which in step (a) of the process, the solution from which the stated insoluble complex is precipitated is boiled under reflux and then acidified to a free acid content of at least 0.5 M HCl prior to step (b) being carried out.

10. A process as claimed in claim 1 in which step (c) is carried out by forming a slurry of the precipitate from step (b) in purified water and adding caustic soda thereto whilst boiling the slurry.

11. A process as claimed in claim 1 in which in step (d) of the process sodium nitrite is utilized as the alkali metal nitrite and it is added in about twice the stoichiometric amount.

12. A process as claimed in claim 1 in which, in step (d) of the process, acidification with nitric acid is effected using concentrated nitric acid until the pH of the solution is less than 1.

13. A process as claimed in claim 12 in which acidification is carried out until the pH of the solution is less than zero.

* * * * *